(12) United States Patent
Ikesue et al.

(10) Patent No.: US 8,555,632 B2
(45) Date of Patent: Oct. 15, 2013

(54) WAVE POWER GENERATOR

(75) Inventors: Shunichi Ikesue, Tokyo (JP); Takeshi Yasunaga, Tokyo (JP); Makoto Ohta, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/512,592

(22) PCT Filed: Oct. 26, 2010

(86) PCT No.: PCT/JP2010/068944
§ 371 (c)(1),
(2), (4) Date: May 29, 2012

(87) PCT Pub. No.: WO2011/065170
PCT Pub. Date: Jun. 3, 2011

(65) Prior Publication Data
US 2012/0233999 A1   Sep. 20, 2012

(30) Foreign Application Priority Data

Nov. 30, 2009  (JP) ................. 2009-272765

(51) Int. Cl.
*F03B 17/02* (2006.01)
(52) U.S. Cl.
USPC ............... 60/495; 60/497; 60/499; 60/501
(58) Field of Classification Search
USPC ................ 60/495–504; 290/42, 53
See application file for complete search history.

(56) References Cited

U.S. PATENT DOCUMENTS

| | | | |
|---|---|---|---|
| 6,857,266 B2* | 2/2005 | Dick | 60/496 |
| 8,154,144 B2 | 4/2012 | Muller et al. | |
| 2007/0273156 A1* | 11/2007 | Miyajima et al. | 290/53 |
| 2009/0085357 A1* | 4/2009 | Stewart | 290/53 |
| 2009/0146429 A1* | 6/2009 | Protter et al. | 290/53 |
| 2010/0117367 A1 | 5/2010 | Muller et al. | |

FOREIGN PATENT DOCUMENTS

| | | |
|---|---|---|
| CN | 1871430 A | 11/2006 |
| CN | 201144760 Y | 11/2008 |

(Continued)

OTHER PUBLICATIONS

International Search Report for PCT/JP2010/068944, mailed Feb. 1, 2011.

(Continued)

*Primary Examiner* — Thomas Denion
*Assistant Examiner* — Philip Eklem
(74) *Attorney, Agent, or Firm* — Kanesaka Berner & Partners, LLP (57) ABSTRACT

A wave power generator that can efficiently perform power generation in response to ocean-wave periods, which are waves of varying period, is provided. A vibration receiving portion that is provided in a float floating at a wave surface and that performs power generation by means of vibrations exerted thereon; a mass body that applies a mass loading on the vibration receiving portion from above; a plurality of elastic members that support the mass body in series; and a plurality of locking mechanisms that restrict/release the motion of the plurality of elastic members are provided.

5 Claims, 6 Drawing Sheets

(56) References Cited

FOREIGN PATENT DOCUMENTS

| | | |
|---|---|---|
| JP | 42-15491 B1 | 8/1967 |
| JP | 54-10064 A | 5/1979 |
| JP | 2007297929 A | 11/2007 |
| JP | 2010133394 A | 6/2010 |
| JP | 2010522529 A | 7/2010 |
| WO | 2005040603 A1 | 5/2005 |
| WO | 2008116622 A1 | 10/2008 |

OTHER PUBLICATIONS

Office Action corresponding to CN201080053698.3, dated Dec. 27, 2012.

Notification of Grant of Invention Patent, issued Aug. 2, 2013 for Chinese Patent Application No. 201080053698.3.

\* cited by examiner

WAVE POWER GENERATOR

CROSS-REFERENCE TO RELATED APPLICATIONS

The present application is the U.S. National Stage of International Application No. PCT/JP2010/068944, filed on Oct. 26, 2010; which Application claims priority benefit of Japanese Application No. 2009-272765, filed Nov. 30, 2009.

TECHNICAL FIELD

The present invention relates to a wave power generator and, in particular, to control of the period in a wave power generator.

BACKGROUND ART

With a wave power generator, there is a method of power generation in which, as disclosed in Patent Literature 1, up/down movement of seawater is converted to rotational motion via a mechanical linkage to drive a generator provided in a float.

In addition, Patent Literature 2 discloses power generation performed by combining a vibrator, whose mass changes through injection/extraction of seawater into/from a buoy, with a spring and to make the natural period of the vibrator approach the oscillation period of ocean waves.
{Citation List}
{Patent Literature}
{PTL 1} Japanese Unexamined Patent Application, Publication No. Hei 5-164036
{PTL 2} Japanese Unexamined Patent Application, Publication No. 2007-297929

SUMMARY OF INVENTION

Technical Problem

However, the invention disclosed in Patent Literature 1 has a problem in that, because the size of the float needs to be increased, the construction cost is increased.

In addition, the invention disclosed in Patent Literature 2 has a problem in that, because injection/extraction of the seawater is utilized, the power generation level is decreased when the oscillation period of the ocean waves is small.

The present invention has been conceived in light of such circumstances, and an object thereof is to provide a wave power generator that is capable of efficiently generating power with waves of varying period.

Solution to Problem

In order to solve the above-described problems, a wave power generator of the present invention employs the following solutions.

A wave power generator according to a first aspect of the present invention is provided with a vibration receiving portion that is provided in a float floating at a wave surface and that performs power generation by means of vibrations exerted thereon; a mass body that applies a mass loading on the vibration receiving portion from above; a plurality of elastic members that support the mass body in series; and a plurality of locking mechanisms that restrict/release the motion of the plurality of elastic members.

The period of vibrations exerted on the vibration receiving portion is determined by the mass of the mass body and the elastic moduli of the elastic members. The wave power generator performs power generation by means of the vibration receiving portion by causing the period of the vibrations exerted on the vibration receiving portion to resonate with the wave period that act on the float. In this invention, the mass body is supported by connecting the plurality of elastic members in series, and the motions of the elastic members are changed by controlling the locking mechanisms. For example, in a mass body supported by one elastic member, the motion of that elastic member is restricted by a locking mechanism. Because the motion of the elastic member is restricted by the locking mechanism, the motion of the mass body is restricted. Accordingly, the period of vibrations exerted on the vibration receiving portion can be controlled by controlling the locking mechanisms of the elastic members. Therefore, power generation can be efficiently performed by matching the period of the vibrations exerted on the vibration receiving portion with the waves of varying period that act on the float.

In the wave power generator according to the first aspect of the present invention described above, the plurality of elastic members may be individually connected via a support member.

With this configuration, the plurality of elastic members are individually connected via the support members. Specifically, the individual support members connect the individual elastic members in series. Because of this, the period of the vibrations exerted on the vibration receiving portion changes due to the masses of the support members in addition to that of the mass body. Therefore, by changing the masses and number of the support members, power generation can be efficiently performed by matching the period of the vibrations exerted on the vibration receiving portion with the waves of varying period that act on the float.

In the wave power generator according to the first aspect of the present invention described above, the locking mechanisms may be provided with hydraulic cylinders provided in parallel with the elastic members and on/off valves that switch on/off the circulation of oil in circuits provided in the hydraulic cylinders.

With this configuration, the hydraulic cylinders are employed as the locking mechanisms. In addition, the on/off valves are provided in the hydraulic cylinders. By doing so, when the on/off valves are turned off, oil does not circulate in the circuits provided in the hydraulic cylinders. Because the oil does not circulate in the circuits provided in the hydraulic cylinders, the movement of the hydraulic cylinders is restricted. When the movement of the hydraulic cylinders is restricted, the movement of the elastic members provided in parallel with the hydraulic cylinders is restricted. Because of this, by performing the on/off control of the circulation of the oil supplied to the circuits provided in the hydraulic cylinders, the elastic moduli of the plurality of elastic members that are connected in series can be changed. Therefore, power generation can be efficiently performed by matching the period transmitted to the vibration receiving portion with the waves of varying period that act on the float.

In addition, the on/off valves provided in the hydraulic cylinders are controlled to change the elastic moduli of the plurality of elastic members that are connected in series. Because of this, it is not necessary to provide a separate device for controlling the elastic moduli of the plurality of elastic members that are connected in series. Therefore, the wave power generator can be made smaller and simpler.

A second aspect of the present invention is a wave power generator that may be additionally provided with a horizontal elastic member that is connected to a side wall of the float; and a horizontal vibration receiving portion that performs power generation by means of vibrations exerted thereon by the horizontal elastic member.

With this configuration, the wave power generator can be vibrated in the horizontal direction by means of the horizontal elastic member connected to the side wall of the float. In addition, the vibrations of the wave power generator in the horizontal direction are exerted on the horizontal vibration receiving portion. Because of this, even in the case in which the float swings in the horizontal direction due to the action of waves, the wave power generator can perform power generation from the vibrations in the horizontal direction. Therefore, the power generation can be performed more efficiently.

A third aspect of the present invention is a configuration in which a plurality of wave power generators is provided in the float.

With this configuration, the plurality of wave power generators are provided in the float. By doing so, not only in the case in which the float moves up and down in the vertical direction due to the action of waves but even in the case in which it swings laterally by rolling and pitching, the period of vibrations exerted on the vibration receiving portion can be matched with the wave period. Accordingly, power generation can be performed with the plurality of wave power generators in the case in which the float moves up and down and swings laterally due to waves. Therefore, power generation can be performed more efficiently.

Advantageous Effects of Invention

With the wave power generator according to the aspect of the present invention described above, a mass body is supported by connecting a plurality of elastic members in series, and the motion of the elastic members are changed by controlling locking mechanisms. For example, in a mass body supported by one elastic member, the motion of that elastic member is restricted by a locking mechanism. Because the motion of the elastic member is restricted by the locking mechanism, the motion of the mass body is restricted. Accordingly, the period of vibrations exerted on a vibration receiving portion can be controlled by controlling the locking mechanisms of the elastic members. Therefore, power generation can be efficiently performed by matching the period of the vibrations exerted on the vibration receiving portion with waves of varying period that act on a float.

DESCRIPTION OF EMBODIMENTS

Embodiments according to the present invention will be described below with reference to the drawings.

{First Embodiment}

A first embodiment of the present invention will be described below by using FIGS. 1 to 4.

Figure 1:
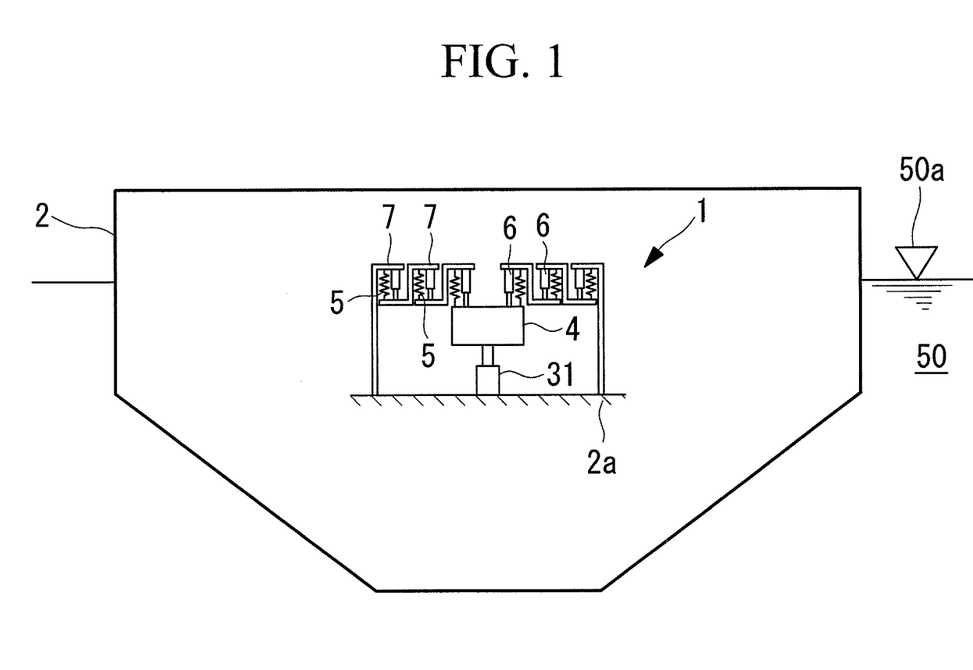
FIG. 1 is a diagram showing, in outline, a wave power generator according to a first embodiment of the present invention.

FIG. 1 is a diagram showing, in outline, a wave power generator 1.

The wave power generator 1 is provided inside a float 2.

The float 2 is a cylinder that becomes narrow downward in the vertical direction in a tapering manner with a trapezoidal longitudinal cross-sectional shape. The float 2 has sufficient buoyancy to float in seawater (wave surface) 50. Note that reference sign 50a in the figure indicates the water level. A floor 2a divides the interior of the float 2 into two in the vertical, up-down direction. A power generating mechanism (not shown) is provided in a portion of the float 2 below the floor 2a. A power generation cylinder (vibration receiving portion) 31; a weight 4; a plurality of springs (elastic members) 5 and a plurality of hydraulic cylinders (locking mechanisms) 6 that support the weight 4; and a frame (support member) 7 that supports the plurality of springs 5 and the plurality of hydraulic cylinders 6 are provided in a portion of the float 2 above the floor 2a. In this embodiment, one set of the power generation cylinder 31 and so forth is provided at a center portion of the floor 2a in plan view.

Figure 2:
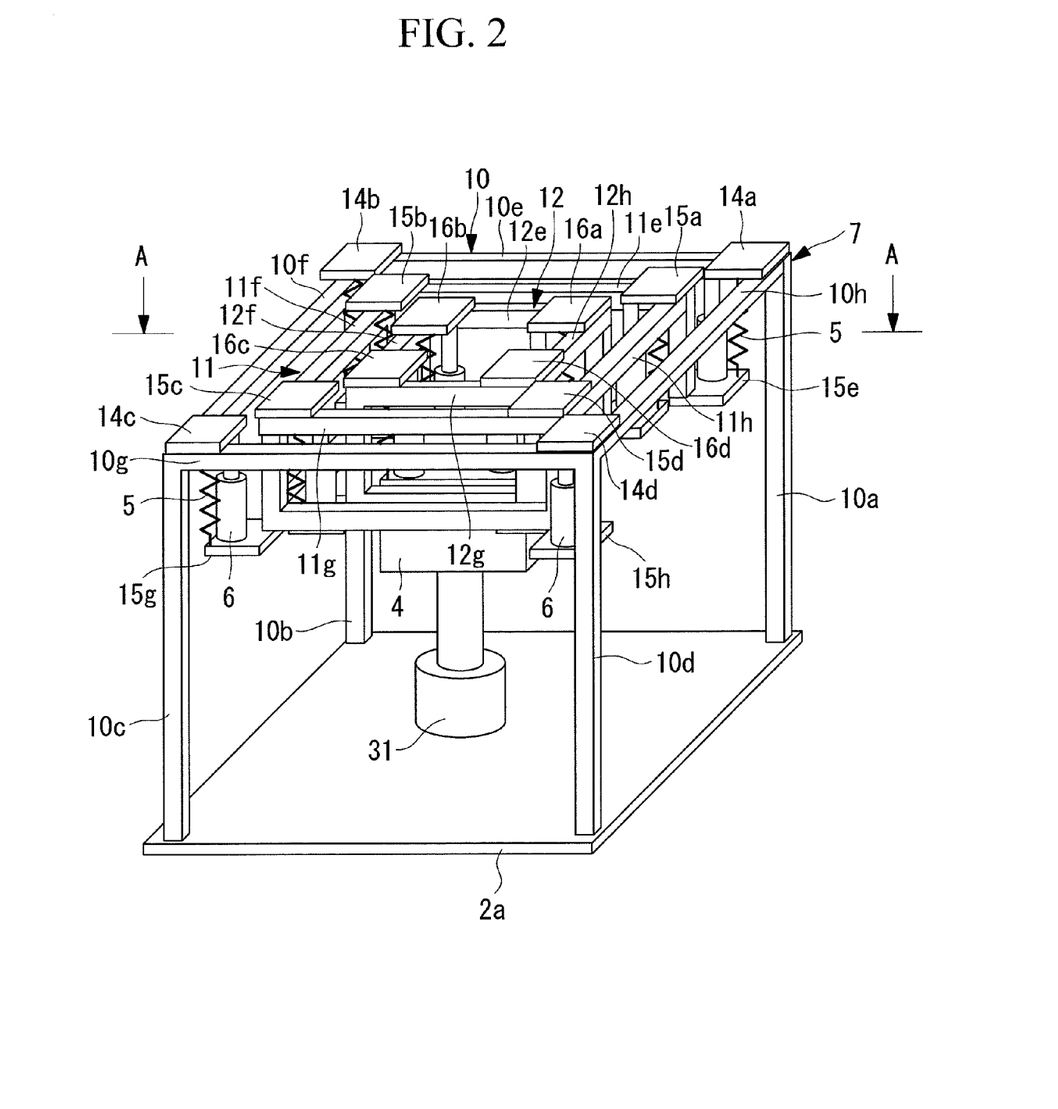
FIG. 2 is an enlarged view of a portion above a floor of the wave power generator shown in FIG. 1.
Figure 3:
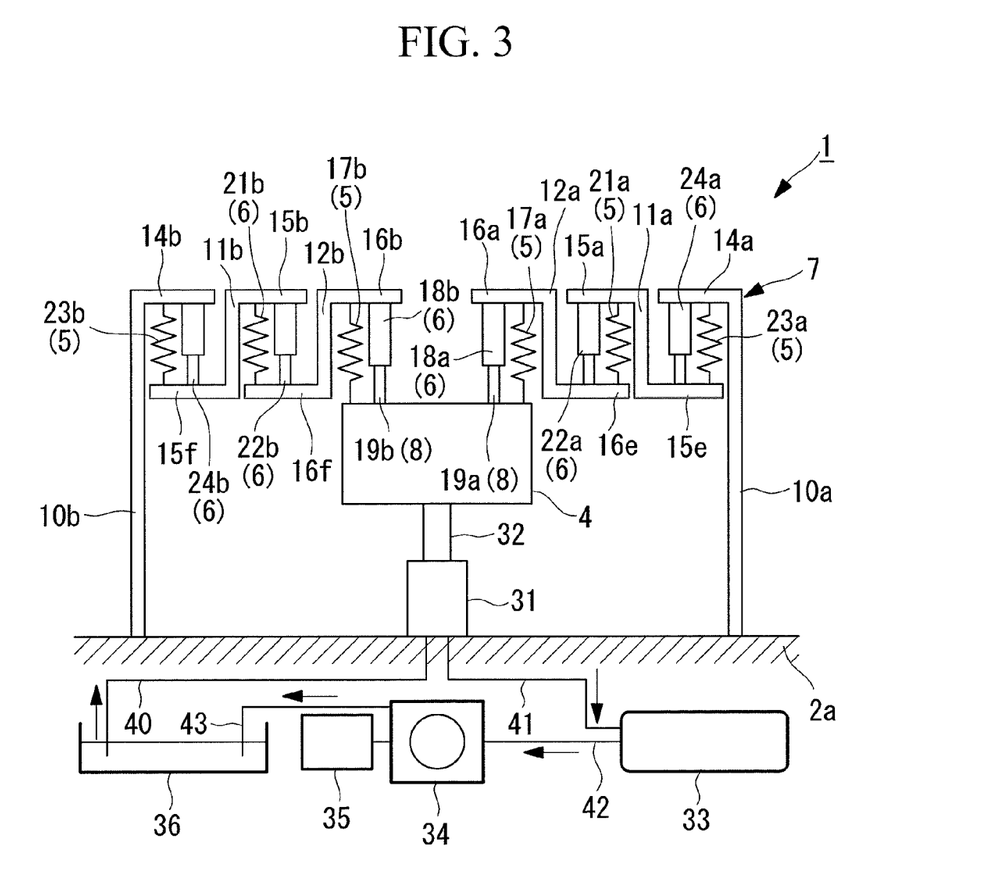
FIG. 3 is a longitudinal cross-sectional view taken along A-A in FIG. 2 showing, in outline, the configuration of the wave power generator.

FIG. 2 shows an enlarged view of the portion above the floor 2a shown in FIG. 1. In addition, FIG. 3 is a configuration diagram showing a longitudinal cross-section taken along A-A in FIG. 2.

Four legs 10a, 10b, 10c, and 10d of the frame 7, which extend vertically to form part of the frame 7, are connected to the floor 2a. Supports 10, 11, and 12, which are part of the frame 7 and form rectangles of multiple sizes, are supported from below by the legs 10a, 10b, 10c, and 10d. The plurality of supports 10, 11, and 12 support the weight 4, the springs 5, which support the weight 4, and the hydraulic cylinders 6 that are provided in parallel with the springs 5.

In addition, the floor 2a is provided with the power generation cylinder 31 that supports the weight 4 from below in the vertical direction.

Although there is no limitation to its shape, the weight 4 in this embodiment is a cuboid. The weight 4 is supported vertically from below by the power generation cylinder 31. The weight 4 is also supported vertically from above by the plurality of springs 5, the plurality of hydraulic cylinders 6, and the frame 7.

The plurality of springs 5 are provided (for example, at twelve locations). The individual springs 5 have the same spring constant.

The hydraulic cylinders 6 are provided in the same number as the number of springs 5 (for example, at twelve locations). Circuits (not shown) in which oil flows are provided inside the individual hydraulic cylinders 6. The individual hydraulic cylinders 6 are individually provided with on/off valves (locking mechanisms) that perform on/off control for inflow/outflow of the oil that circulates in the circuits. The hydraulic cylinders 6 are provided with hydraulic piston portions 8 (see FIG. 3) that slide at inner circumferences of the hydraulic cylinders 6.

When the on/off valves (not shown) are turned on, the oil circulates in the circuits provided in the hydraulic cylinders 6. Accordingly, it is possible to change the strokes of the hydraulic piston portions 8 that slide at the inner circumferences of the hydraulic cylinders 6. When the on/off valves are turned off, the oil does not circulate in the circuits provided in the hydraulic cylinders 6. Accordingly, the movement of the hydraulic piston portions 8 that slide at the inner circumferences of the hydraulic cylinders 6 is restricted.

The frame 7 supports the plurality of springs 5 and the plurality of hydraulic cylinders 6 so that they are connected in series. The frame 7 is connected to the weight 4 via the plurality of springs 5 and the plurality of hydraulic cylinders 6.

The frame 7 has the four legs 10a, 10b, 10c, and 10d that are connected to the floor 2a and the supports 10, 11, and 12 which form cuboids of multiple (for example, three) sizes.

The support (hereinafter referred to as "first-stage frame") 10, which forms the largest cuboid of the three types of cuboids, is provided with a surface (herein after referred to as "first-stage top surface") that is parallel to the floor 2a and the four legs 10a, 10b, 10c, and 10d that are connected to the floor 2a extending downward from the first-stage top surface. The first-stage top surface is formed of four frames 10e, 10f, 10g, and 10h.

First-stage support plates 14a, 14b, 14c, and 14d are individually provided at the four corners of the first-stage top surface. The first-stage support plates 14a, 14b, 14c and 14d are individually provided at inner sides of corner portions of the four frames 10e, 10f, 10g, and 10h, which form the first-stage top surface. The first-stage support plates 14a, 14b, 14c, and 14d are formed in large enough sizes to support the springs 5 and the hydraulic cylinders 6.

The support (hereinafter referred to as "second-stage frame") 11, which forms the medium-sized cuboid of the three types of cuboids, is provided with two surfaces (hereinafter referred to as "second-stage top surface" and "second-stage bottom surface") that are parallel to the floor 2a and four legs that connect between the second-stage top surface and the second-stage bottom surface. FIG. 3 shows two of the four legs, that is, 11a and 11b.

The size of the second-stage frame 11 is smaller than that of the first-stage frame 10.

The second-stage top surface is formed of four frames 11e, 11f, 11g, and 11h. The second-stage bottom surface is formed of four frames (not shown). Second-stage top-surface support plates 15a, 15b, 15c, and 15d are individually provided at the four corners of the second-stage top surface. The second-stage top-surface support plates 15a, 15b, 15c, and 15d are individually provided at inner sides of the corners of the four frames 11e, 11f, 11g, and 11h that form the second-stage top surface.

The second-stage bottom-surface support plates 15e, 15f, 15g, and 15h, which protrude from the outer circumference of the second-stage bottom surface, are individually provided at the four corners of the second-stage bottom surface. The second-stage top-surface support plates 15a, 15b, 15c, and 15d and the second-stage bottom-surface support plates 15e, 15f, 15g, and 15h are formed in large enough sizes to support the springs 5 and the hydraulic cylinders 6.

The support (hereinafter referred to as "third-stage frame") 12, which forms the smallest cuboid of the three types of cuboids, is provided with two surfaces (herein after referred to as "third-stage top surface" and "third-stage bottom surface") that are parallel to the floor 2a and four legs that connect between the third-stage top surface and the third-stage bottom surface. FIG. 3 shows two of the four legs, that is, 12a and 12b.

The third-stage frame 12 is smaller in size than the second-stage frame 11.

The third-stage top surface is formed of four frames 12e, 12f, 12g, and 12h. The third-stage bottom surface is formed of four frames (not shown). Third-stage top-surface support plates 16a, 16b, 16c, and 16d are individually provided at the four corners of the third-stage top surface. The third-stage top-surface support plates 16a, 16b, 16c, and 16d are individually provided at inner sides of the corners of the four frames 12e, 12f, 12g, and 12h that form the third-stage top surface.

The third-stage bottom-surface support plates, which protrude from the outer circumference of the third-stage bottom surface, are individually provided at the four corners of the third-stage bottom surface. Of the four third-stage bottom-surface support plates provided, only two third-stage bottom-surface support plates 16e and 16f are shown in FIG. 3.

The third-stage top-surface support plates 16a, 16b, 16c, and 16d and the third-stage bottom-surface support plates are formed in large enough sizes to support the springs 5 and the hydraulic cylinders 6.

Next, a method in which the weight 4 is supported by the plurality of springs 5, the plurality of hydraulic cylinders 6, and the frame 7 will be described by using FIG. 3.

The springs 5 (hereinafter referred to as "third-stage springs") and the hydraulic cylinders 6 (hereinafter referred to as "third-stage hydraulic cylinders") are individually connected at the four corners of the top surface of the weight 4. FIG. 3 shows two of each, that is, the third-stage springs 17a and 17b and the third-stage hydraulic cylinders 18a and 18b.

Here, the third-stage spring 17a and the third-stage hydraulic cylinder 18a support the weight 4 together with the third-stage spring 17b and the third-stage hydraulic cylinder 18b in left-right symmetry. Therefore, only the side with the third-stage spring 17a and the third-stage hydraulic cylinder 18a (right side in this figure) will be described below, and, because the side with the third-stage spring 17b and the third-stage hydraulic cylinder 18b (left side in this figure) is the same as the side with the third-stage spring 17a and the third-stage hydraulic cylinder 18a, the description thereof will be omitted.

The other ends of the third-stage spring 17a and the third-stage hydraulic cylinder 18a are connected to the third-stage top-surface support plate 16a. The third-stage hydraulic cylinder 18a connected to the third-stage top-surface support plate 16a is provided so that an end surface of a piston portion 19a, which slides at an inner circumference of the third-stage hydraulic cylinder 18a, comes in contact with the top surface of the weight 4.

The third-stage top-surface support plate 16a is connected to the third-stage bottom-surface support plate 16e with the frame 12a, which extends below the third-stage top-surface support plate 16a. The third-stage top-surface support plate 16a, the frame 12a, and the third-stage bottom-surface support plate 16e are connected so as to form an S shape.

At the top surface of the third-stage bottom-surface support plate 16e, the spring 5 (hereinafter referred to as "second-stage spring") and the hydraulic cylinder 6 (hereinafter referred to as "second-stage hydraulic cylinder") are individually connected. The other ends of the second-stage spring 21a and the second-stage hydraulic cylinder 22a are connected to the second-stage top-surface support plate 15a.

With the third-stage top-surface support plate 16a, the frame 12a, and the third-stage bottom-surface support plate 16e that are connected in an S shape, the third-stage spring 17a and the third-stage hydraulic cylinder 18a, which support the weight 4, are connected in series with the second-stage spring 21a and the second-stage hydraulic cylinder 22a.

Here, the second-stage hydraulic cylinder 22a is provided so that an end surface of a piston portion (not shown), which slides at an inner circumference of the second-stage hydraulic cylinder 22a, comes into contact with the top surface of the third-stage bottom-surface support plate 16e.

The second-stage top-surface support plate 15a is connected to the second-stage bottom-surface support plate 15e with the frame 11a that extends below the second-stage top-surface support plate 15a. The second-stage top-surface support plate 15a, the frame 11a, and the second-stage bottom-surface support plate 15e are connected so as to form an S shape.

At the top surface of the second-stage bottom-surface support plate 15e, the spring 5 (hereinafter referred to as "third-stage spring") and the hydraulic cylinder 6 (hereinafter referred to as "third-stage hydraulic cylinder") are individually connected. The other ends of the third-stage spring 23a and the third-stage hydraulic cylinder 24a are connected to the first-stage support plate 14a.

With the second-stage top-surface support plate 15a, the frame 11a, and the second-stage bottom-surface support plate 15e that are connected in an S shape, the third-stage spring 17a and the third-stage hydraulic cylinder 18a, which support the weight 4, are connected in series with the second-stage spring 21a and the second-stage hydraulic cylinder 22a, as well as the first-stage spring 23a and the first-stage hydraulic cylinder 24a.

Here, the first-stage hydraulic cylinder 23a, which is connected to the second-stage bottom-surface support plate 15e is provided so that an end surface of a piston portion (not shown), which slides at an inner circumference of the first-stage spring hydraulic cylinder 23a, comes into contact with the top surface of the second-stage bottom-surface support plate 15e.

The first-stage support plate 14a is connected to the floor 2a with the leg 10a that extends below the first-stage support plate 14a.

With these features, the weight 4 is supported via the frames 11a, 12a, 14a, 15a, 15e, 16a, and 16e that connect, in series, the plurality of springs 17a, 21a, and 23a and the plurality of hydraulic cylinders 18a, 22a, and 24a.

Next, a method will be described with which the wave power generator 1 performs power generation by means of vibrations of the weight 4 supported via 11a, 12a, 14a, 15a, 15e, 16a, and 16e which connect, in series, the plurality of springs 17a, 21a, and 23a and plurality of hydraulic cylinders 18a, 22a, and 24a.

The weight 4 is supported from below with the power generation cylinder 31. With the weight 4 moving up and down in the vertical direction, the power-generation piston portion 32, which slides at the inner circumference of the power generation cylinder 31 that supports the weight 4, moves up and down in the vertical direction.

In addition, the waves 50 act on the float 2 (see FIG. 1). Because of this, the float 2 oscillates in the vertical, top-bottom direction due to the waves 50.

The power generation cylinder 31 is subjected to vibrations (hereinafter, referred to as "natural period") in the vertical, up-down direction, which are generated by connecting the weight 4 in series therewith by using the plurality of springs 17a, 21a, and 23a and the plurality of hydraulic cylinders 18a, 22a, and 24a, as well as relative motion due to oscillation (hereinafter, referred to as "ocean-wave period") in the vertical, up-down direction, caused by the action of the waves 50 on the float 2. The relative motion between the natural period and ocean-wave period acts as a load on the power-generation cylinder 31.

The stroke of the power-generation piston portion 32 is changed by the relative motion between the natural period and the ocean-wave period exerted on the power-generation cylinder 31. The power generation mechanism, described below, generates electricity through the changes in stroke of the power-generation piston portion 32.

Specifically, due to the changes in stroke of the power-generation piston portion 32, the oil guided from a pipe 40 to the power-generation cylinder 31 is pressurized. The oil pressurized by the power-generation piston portion 32 flows out to a pipe 41 that is connected to the power-generation cylinder 31. The pressurized oil that has flowed out to the pipe 41 is guided to an accumulator 33. The oil guided into the accumulator 33 is accumulated in the accumulator 33. The oil accumulated in the accumulator 33 flows out to a pipe 42. The pressurized oil that has flowed out to the pipe 42 is guided to a hydraulic motor 34. The hydraulic motor 34 is driven by the pressurized oil which is guided thereto by the pipe 42.

By driving the hydraulic motor 34, power generation is performed by the generator 35 connected to a hydraulic motor 34. Accordingly, the wave power generator 1 performs power generation.

In addition, the oil that has driven the hydraulic motor 34 flows out to a pipe 43, which is connected to the hydraulic motor 34. The oil that has flowed out to the pipe 43 is guided to an oil storage tank 36. The oil stored in the oil storage tank 36 is guided to the power-generation cylinder 31 by the pipe 40 described above.

Next, a method of controlling the spring constants (elastic moduli) for the springs 5, which support the weight 4, will be described by using FIG. 4.

Figure 4:
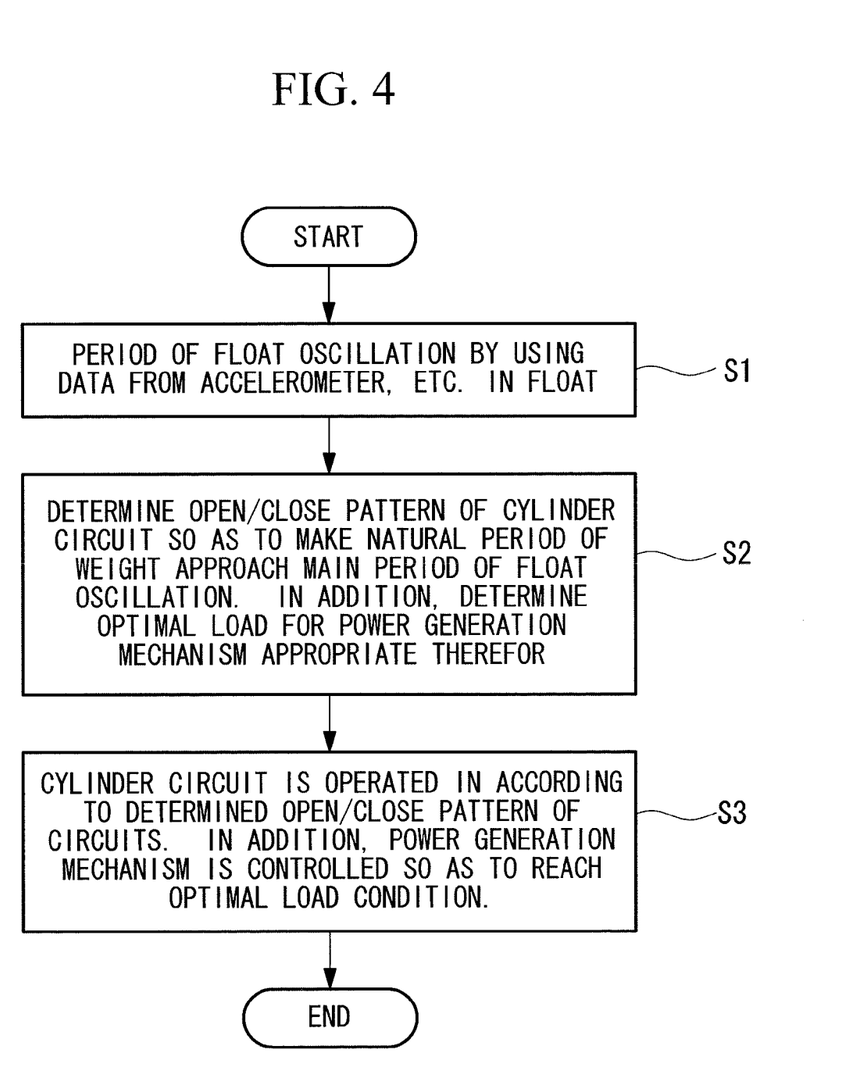
FIG. 4 is a flowchart of a method of controlling the wave power generator shown in FIG. 3.

FIG. 4 shows a flowchart for controlling the spring constants for the weight so as to make the natural periods exerted on the power-generation cylinder due to the vibrations of the weight approach the ocean-wave period that acts on the float.

First, oscillation vibrations of the float 2 are measured by using signals from an accelerometer (not shown) provided in the float 2. With the oscillation vibrations of the float 2, the ocean-wave period that acts on the float 2 is determined (step S1).

The on/off states of the individual on/off valves provided in the first-stage hydraulic cylinder to the third-stage hydraulic cylinder 18a, 22a, and 24a are determined (step S2) so as make the ocean-wave period determined in step S1 similar to the natural period of the weight 4.

In addition, an optimal load, which is an attenuation level of the power-generation cylinder 31 supported by the weight 4 from below, is determined (step S2).

After determining the on/off states of the individual on/off valves provided in the first-stage hydraulic cylinder to the third-stage hydraulic cylinder 18a, 22a, and 24a and the attenuation level of the power-generation cylinder 31 in step S2, the individual on/off valves provided in the first-stage hydraulic cylinder to the third-stage hydraulic cylinder 18a, 22a, and 24a are controlled (step S3).

In addition, the power-generation cylinder 31 is controlled (step S3) so as to achieve a desired attenuation level.

Step S1 to step S3 are repeated once every 10 minutes as described above, thereby making the natural period of the weight 4 approach the ocean-wave period.

Next, changes in the spring constants and the natural period of the conical 4 will be described for the case in which the on/off control is performed for the on/off valves provided in the hydraulic cylinder 5.

The individual springs 17a, 21a, and 23a are connected in series, and the individual springs 17a, 21a, and 23a are provided with the individual hydraulic cylinders 18a, 22a, and 24a in parallel therewith. Because of this, a spring constant K at which the weight 4 vibrates can be changed by performing the on/off control for the individual on/off valves provided in the individual hydraulic cylinders 18a, 22a, and 24a.

First of all, a case in which the individual on/off valves provided in the individual hydraulic cylinders 18a, 22a, and 24a are turned on will be described.

Oil individually circulates in circuits provided in the individual hydraulic cylinders 18a, 22a, and 24a. Because of this, the individual hydraulic cylinders 18a, 22a, and 24a do not restrict the movement of the individual springs 17a, 21a, and 23a in the vertical, up-down direction.

In this case, the spring constant K at which the weight 4 vibrates follows expression (1). Here, K is the total spring constant when the plurality of springs 5 are connected in series, and k is individual spring constants for the first-stage to third-stage springs 17a, 21a, and 23a.

$$K=k/3 \tag{1}$$

When the total spring constant K follows expression (1), the natural period of the weight 4 loaded on the power-generation cylinder 31 follows expression (2). Here, with regard to mass, only the weight 4 is considered, and the mass of the frame 7 with the individual supports 10, 11, 12 is not taken into consideration. In addition, T is the natural period of the weight 4 loaded on the power-generation cylinder 31; m is mass of the weight 4; k is each spring constant for the first-stage spring to the third-stage spring 17a, 21a, and 23a, described above.

$$T=2\pi(3m/k)^{1/2} \approx 1.73 \times 2\pi(m/k)^{1/2} \tag{2}$$

Next, the case in which the on/off valve provided in the first-stage hydraulic cylinder 24a is turned off and the individual on/off valves provided in the second-stage hydraulic cylinder 22a and the third-stage hydraulic cylinder 18a are turned on will be described.

Because the on/off valve provided in the first-stage hydraulic cylinder 24a is turned off, the oil does not circulate in the circuit provided in the first-stage hydraulic cylinder 24a. Because the oil does not circulate in the first-stage hydraulic cylinder 24a, the first-stage hydraulic cylinder 24a restricts the movement of the first-stage spring 23a in the vertical, up-down direction. Because the movement of the first-stage spring 23a is restricted, the movement is restricted between the first-stage support plate 14a and the second-stage bottom-surface support plate 15e connected to the first-stage hydraulic cylinder 24a and the first-stage spring 23a.

On the other hand, because the individual on/off valves provided in the second-stage hydraulic cylinders 22a and the third-stage hydraulic cylinder 18a are turned off, the oil individually circulates in the circuits provided in the second-stage hydraulic cylinder 22a and the third-stage hydraulic cylinder 18a. Because the oil individually circulates in the second-stage hydraulic cylinder 22a and the third-stage hydraulic cylinder 18a, the second-stage hydraulic cylinder 22a and the third-stage hydraulic cylinder 18a do not restrict the movement of the second-stage spring 21a and the third-stage spring 17a in the vertical, up-down direction.

In this case, the total spring constant K with which the weight 4 vibrates follows expression (3). Here, K and k are the same as those described above.

$$K=k/2 \tag{3}$$

When the total spring constant K follows expression (3), the natural period of the weight 4 loaded on the power-generation cylinder 31 follows expression (4). Here, T, m, and k are the same as those described above.

$$T=2\pi(2m/k)^{1/2} \approx 1.41 \times 2\pi(m/k)^{1/2} \tag{4}$$

Note that, although the description here has been given for the case in which the on/off valve provided in the first-stage hydraulic cylinder 24a is turned off and the individual on/off valves provided in the second-stage hydraulic cylinder 22a and the third-stage hydraulic cylinder 18a are turned on, the description would be similar even if it was for the case in which the on/off valve provided in the second-stage hydraulic cylinder 22a is turned off and the individual on/off valves provided in the first-stage hydraulic cylinder 24a and the third-stage hydraulic cylinder 18a are turned on.

The description would also be similar even if it was for the case in which the on/off valve provided in the third-stage hydraulic cylinder 18a is turned off and the individual on/off valves provided in the second-stage hydraulic cylinder 22a and the first-stage hydraulic cylinder 24a are turned on.

Next, the case in which the individual on/off valves provided in the third-stage hydraulic cylinder 18a and the second-stage hydraulic cylinder 22a are turned off and the on/off valve provided in the first-stage hydraulic cylinder 24a is turned on will be described.

Because the individual on/off valves provided in the third-stage hydraulic cylinder 18a and the second-stage hydraulic cylinder 22a are turned off, the oil does not circulate in the individual circuits provided in the third-stage hydraulic cylinder 18a and the second-stage hydraulic cylinder 22a. Because the oil does not circulate in the third-stage hydraulic cylinder 18a and the second-stage hydraulic cylinder 22a, the second-stage hydraulic cylinder 22a restricts the movement of the second-stage spring 21a in the vertical, up-down direction. In addition, the third-stage hydraulic cylinder 18a restricts the movement of the third-stage spring 17a in the vertical, up-down direction.

Because the movement of the second-stage spring 21a is restricted, movement is restricted between the second-stage top-surface support plate 15a and the third-stage bottom-surface support plate 16e. In addition, because the movement of the third-stage spring 17a is restricted, movement is restricted between the third-stage up-surface support plate 16a and the weight 4.

On the other hand, because the on/off valve provided in the first-stage hydraulic cylinder 24a is turned on, the oil circulates in the circuit provided in the first-stage hydraulic cylinder 24a. Because of this, the first-stage hydraulic cylinder 24a does not restrict movement of the first-stage spring 23a in the vertical, up-down direction.

In this case, the total spring constant K at which the weight 4 vibrates follows expression (5). Here, K and k are the same as those described above.

$$K=k \tag{5}$$

When the total spring constant K follows expression (5), the natural period of the weight 4 loaded on the power-generation cylinder 31 follows expression (6). Here, T, m, and k are the same as those described above.

$$T=2\pi(m/k)^{1/2} \tag{6}$$

Next, the case in which the individual on/off valves provided in the first-stage hydraulic cylinder to the third-stage hydraulic cylinder 24a, 22a, and 18a are turned off will be described.

Because the individual on/off valves provided in the first-stage hydraulic cylinder to the third-stage hydraulic cylinder 24a, 22a, and 18a are turned off, the oil does not circulate in the individual circuits provided in the first-stage hydraulic cylinder to the third-stage hydraulic cylinder 24a, 22a, and 18a. Because the oil does not circulate in the first-stage hydraulic cylinder to the third-stage hydraulic cylinder 24a, 22a, and 18a, the first-stage hydraulic cylinder to the third-stage hydraulic cylinder 24a, 22a, and 18a restrict the movement of the first-stage spring to the third-stage spring 23a, 21a, and 17a in the vertical, up-down direction.

Because the movement is restricted for the first-stage spring to the third-stage spring 23a, 21a, and 17a, movement between the first-stage support plate 14a and the second-stage bottom-surface support plate 15e, movement between the second-stage top-surface support plate 15a and the third-stage bottom-surface support plate 16e, and movement between the third-stage top-surface support plate 16a and the weight 4 are restricted. Because of this, the movement of the weight 4 is restricted, and thus, the natural period at which the weight 4 vibrates becomes zero.

As has been described above, the wave power generator according to this embodiment affords the following effects and advantages.

The weight (mass body) 4 is supported by connecting the plurality of springs (elastic members) 5 in series, and the motions of the individual springs 4 are changed by controlling the individual hydraulic cylinders (locking mechanisms) 6. Because of this, by controlling the individual on/off valves (locking mechanisms) provided in the individual hydraulic cylinders 6, the natural period (period) of the weight 4 loaded on the power-generation cylinder (vibration receiving portion) 31 is controlled. Therefore, power generation can be efficiently performed by matching the natural period of the weight 4 loaded on the power-generation cylinder 31 with varying ocean-wave period (period of waves) that act on the float 2.

The plurality of springs 5 are individually connected via the first-stage frame 10, the second-stage frame 11, and the third-stage frame 12 (support members). Specifically, the first-stage frame 10, the second-stage frame 11, and the third-stage frame 12 individually connect the springs 5 in series. Because of this, the natural period of the weight 4 loaded on the power-generation cylinder 31 changes due to the masses of the second-stage frame 11 and the third-stage frame 12 in addition to the mass of the weight 4. Therefore, by changing the masses of the second-stage frame 11 and the third-stage frame 12 and the number (amount) of stages in the frame 7, power generation can be efficiently performed by matching the natural period of the weight 4 loaded on the power-generation cylinder 31 with varying ocean-wave periods that act on the float 2.

The hydraulic cylinders 6 are employed as the locking mechanisms. In addition, the on/off valves are provided in the hydraulic cylinders 6. By doing so, when the on/off valves are turned off, the oil does not circulate in the circuits provided in the hydraulic cylinders 6. Because the oil does not circulate in the circuits provided in the hydraulic cylinders 6, the movement of the hydraulic cylinders 6 is restricted. When the movement of the hydraulic cylinders 6 is restricted, the movement of the springs 5 provided in parallel with the hydraulic cylinders 6 is restricted. Because of this, by controlling the circulation of the oil supplied to the circuits provided in the hydraulic cylinders 6 by means of the on/off valves, it is possible to change the total spring constant (elastic modulus) K of the plurality of springs 5 which cause the weight 4 to vibrate. Therefore, by changing the total spring constant K with which the weight 4 vibrates, power generation can be efficiently performed by matching the natural period of the weight 4 loaded on the power-generation cylinder 31 with the varying ocean-wave periods that act on the float 2.

In addition, the individual on/off valves provided in the individual hydraulic cylinders 6 are controlled to change the total spring constant K of the plurality of springs 5 that are connected in series. Because of this, it is not necessary to provide a separate device for controlling the spring constants k for the individual springs 5. Therefore, the wave power generator 1 can be made smaller and simpler.

Note that, although this embodiment has been described assuming that the power-generation cylinder 31 serves as the vibration receiving portion on which the vibrations of the weight 4 are exerted, it may be a piezoelectric element. In this case, supply equipment and storage equipment for oil, which are power generating mechanisms, are not required.

In addition, although this embodiment has been described assuming that the masses of the second-stage frame 11 and the third-stage frame 12 are not taken into consideration, in the case in which the masses of the second-stage frame 11 and the third-stage frame 12 are taken into consideration, the natural period of the weight 4, which is loaded on the power-generation cylinder 31, can be calculated more accurately.

Specifically, in the case in which the mass of the second-stage frame 11 and the mass of the third-stage frame 12 are taken into consideration, where the individual on/off valves provided in the third-stage hydraulic cylinder 18a and the second-stage hydraulic cylinder 22a are turned off and the on/off valve provided in the first-stage hydraulic cylinder 24a is turned on, the natural period T of the weight 4 loaded on the power-generation cylinder 31 follows expression (7). Note that, here, $m_{f2}$ is the mass of the second-stage frame 11; $m_{f3}$ is the mass of the third-stage frame 12; and m, K, and k are the same as those described above.

$$T=2\pi[(m+m_{f2}+m_{f3})/k]^{1/2} \quad (7)$$

In addition, in the case in which the mass of the second-stage frame 11 and the mass of the third-stage frame 12 are taken into consideration, where the individual on/off valves provided in the first-stage hydraulic cylinder 24a and the second-stage hydraulic cylinder 22a are turned off and the on/off valve provided in the third-stage hydraulic cylinder 18a is turned on, the natural period T of the weight 4 loaded on the power-generation cylinder 31 follows expression (8). Note that, with regard to m, K, and k here, they are the same as those described above.

$$T=2\pi(m/k)^{1/2} \quad (8)$$

In addition, in the case in which the mass of the second-stage frame 11 and the mass of the third-stage frame 12 are taken into consideration, where the on/off valve provided in the third-stage hydraulic cylinder 18a is turned off and the individual on/off valves provided in the second-stage hydraulic cylinder 22a and the first-stage hydraulic cylinder 24a are turned on, the natural period T of the weight 4 loaded on the power-generation cylinder 31 follows expression (9). Note that, here, $-m_{f3}$, m, K, and k^ are the same as those described above.

$$T=2\pi[(m+m_{f3})/k]^{1/2} \quad (9)$$

{Second Embodiment}

A second embodiment of the present invention will be described below by using FIG. 5.

This embodiment differs from the first embodiment in that a plurality of wave power generators are provided in the float, and other points are the same. Therefore, descriptions of the same configuration, on/off control method, and method of power generation will be omitted.

Figure 5:
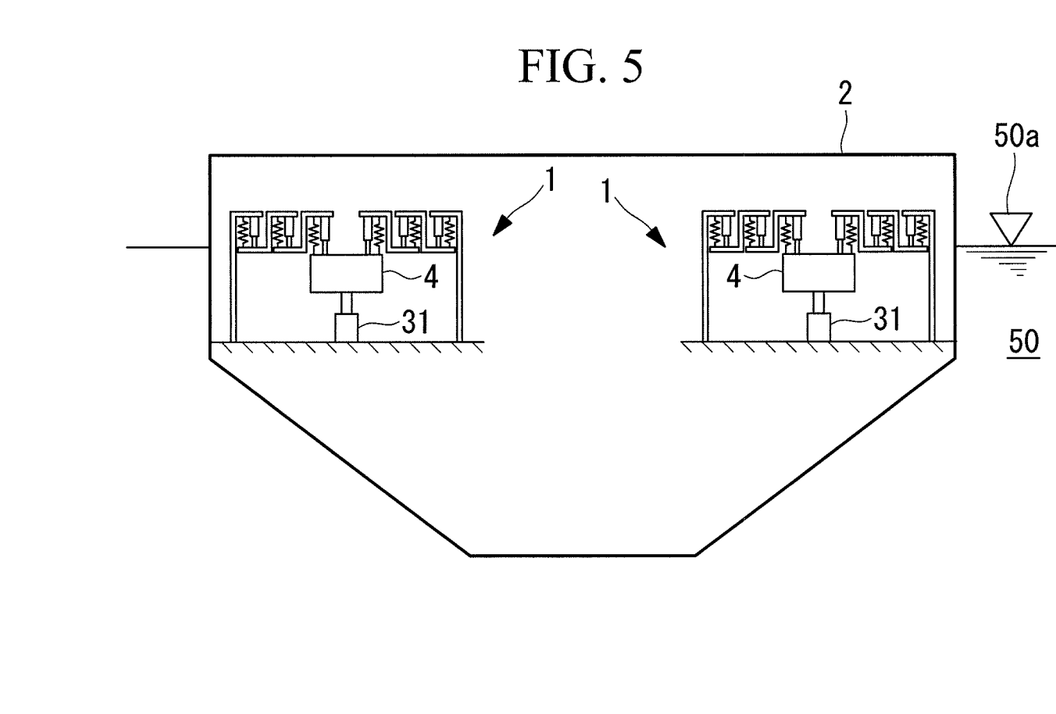
FIG. 5 is a diagram showing, in outline, a wave power generator according to a second embodiment of the present invention.

FIG. 5 is a diagram showing, in outline, the interior of the float in which the plurality of wave power generators shown in FIG. 1 are provided.

The plurality of (for example, six) wave power generators 1 are provided. In the figure, two wave power generators 1 are shown. The wave power generators 1 are disposed evenly spaced at an inner circumference of the float 2.

Because the plurality of wave power generators 1 are disposed evenly spaced along the inner circumference of the float 2, in the case in which lateral swinging, such as pitching, rolling, or the like, occurs in the float 2 due to waves that act on the float 2, natural periods of the individual weights 4 can be made to match the ocean-wave periods with the plurality of wave power generators 1.

As has been described above, the wave power generator according to this embodiment affords the following effects and advantages.

The plurality of wave power generators 1 are provided in the float 2. By doing so, not only in the case in which the float 2 moves up and down in the vertical direction due to the action of the waves 50, but also in the case in which it swings laterally by rolling and pitching, the natural periods (periodicities) of the individual weights 4 loaded on the power-generation cylinders (vibrations receiving portions) 31 of the individual wave power generators 1 can be matched with the ocean-wave periods (wave periodicities). Accordingly, power generation can be performed with the plurality of wave power generators 1 in the cases in which the float 2 moves up and down and swings laterally due to the waves 50. Therefore, the power generation can be performed more efficiently.

{Third Embodiment}

A third embodiment of the present invention will be described below by using FIG. 6.

The wave power generator of this embodiment differs from that of the first embodiment in that the support member is connected to a sidewall of the float with a horizontal elastic member, and other points are the same. Therefore, descriptions of the same configuration, on/off control method, and method of power generation will be omitted.

Figure 6:
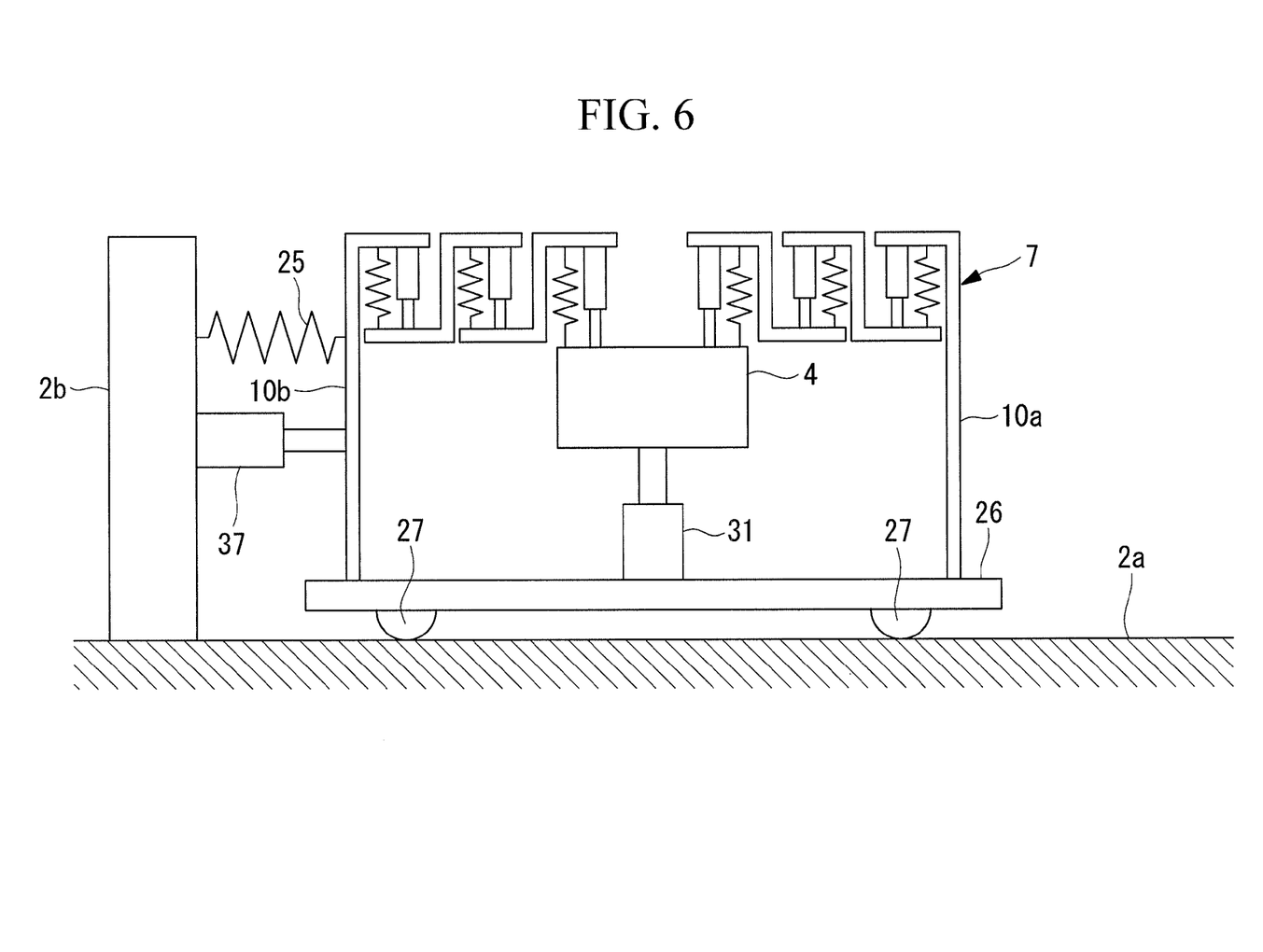
FIG. 6 is a longitudinal cross-sectional view showing, in outline, the configuration of a wave power generator according to a third embodiment of the present invention.

FIG. 6 is a longitudinal cross-sectional view showing, in outline, the configuration of the wave power generator whose support member is connected to the sidewall of the float with the horizontal elastic member.

The leg 10*b* of the frame (support member) 7 is connected to a side wall 2*b* in the float with a horizontal spring 25 (horizontal elastic member). A horizontal power-generation cylinder (horizontal vibration receiving portion) 37 is provided between the leg 10*b* and the side wall 2*b* in parallel with the horizontal spring 25.

The legs 10*a* and 10*b* and the power-generation cylinder 31 are installed on a moving base 26. A plurality of wheels 27 are provided on the opposite surface of the moving base 26.

With the wheels 27 provided in the moving base 26, the wave power generator 1 can move in the horizontal direction on the floor 2*a* of the float 2 (not shown). In addition, the movement with which the wave power generator 1 provided on the moving base 26 moves on the floor 2*a* can be converted to vibrations in the horizontal direction by the horizontal spring 25 connected to the leg 10*b*. The vibrations in the horizontal direction in the wave power generator 1 caused by the horizontal spring 25 are exerted on the horizontal power-generation cylinder 37. The horizontal power-generation cylinder 37 generates electricity by means of the vibrations exerted thereon.

As has been described above, the wave power generator according to this embodiment affords the following effects and advantages.

The wave power generator 1 can be vibrated in the horizontal direction by means of the horizontal spring (horizontal elastic member) 25 connected to the sidewall 2*b* of the float. In addition, the vibrations of the wave power generator 1 in the horizontal direction are exerted on the horizontal power-generation cylinder (horizontal vibration receiving portion) 37. Because of this, even in the case in which the float swings in the horizontal direction due to the action of waves, the wave power generator 1 can perform power generation from the vibrations in the horizontal direction. Therefore, the power generation can be performed more efficiently.

{Reference Signs List}
1 wave power generator
2 float
4 mass body (weight)
5 elastic member (spring)
6 locking mechanism (hydraulic cylinder)
31 vibration receiving portion (power-generation cylinder)
50 wave surface (seawater)

The invention claimed is:

1. A wave power generator comprising:
    a vibration receiving portion that is provided in a float floating at a wave surface and that performs power generation by means of vibrations exerted thereon;
    a mass body that applies a mass loading on the vibration receiving portion from above;
    a plurality of elastic members that support the mass body in series; and
    a plurality of locking mechanisms that restrict/release the motion of the plurality of elastic members.

2. A wave power generator according to claim 1, wherein the plurality of elastic members are individually connected via a support member.

3. A wave power generator according to claim 1, wherein the locking mechanisms are provided with hydraulic cylinders provided in parallel with the elastic members and on/off valves that switch on/off the circulation of oil in circuits provided in the hydraulic cylinders.

4. A wave power generator according to claim 1, further comprising:
    a horizontal elastic member that is connected to a side wall of the float; and
    a horizontal vibration receiving portion that performs power generation by means of vibrations exerted thereon by the horizontal elastic member.

5. A wave power generator according to claim 1, wherein a plurality thereof are provided in the float.

* * * * *